United States Patent Office 3,667,962
Patented June 6, 1972

3,667,962
CARBONATED DRINK BASE FOR MAKING CARBONATED BEVERAGES BY ADDITION TO WATER
Edward L. Fritzberg, Minneapolis, Minn., and Donald C. Fellenz, Westfield, N.Y., assignors to The Pillsbury Company, Minneapolis, Minn.
No Drawing. Filed July 14, 1969, Ser. No. 841,613
Int. Cl. A23l 1/26
U.S. Cl. 99—78                                        9 Claims

ABSTRACT OF THE DISCLOSURE

A dried base which forms a carbonated beverage when added to water. The base consists of two porous friable bodies, one containing a soluble, thermoplastic, amorphous saccharide and an edible acid, the other a soluble, thermoplastic, amorphous saccharide and an edible carbonate which will react with the acid when placed in water to evolve carbon dioxide. Premature reaction between acid and carbonate is prevented by their physical separation.

---

The present invention relates to dried drink bases of the type that form a carbonated beverage when placed in water.

The general objective of the invention is to provide a dry drink base composed of friable porous pieces which break up and dissolve quickly when placed in water and contain components that react with one another to evolve carbon dioxide. Prior food compositions of this kind have been slow to dissolve, have had a tendency, even after being stirred, to form a deposit in the bottom of the glass or sometimes to react chemically before being used.

Tablets or powders previously used in preparing carbonated drinks have a slow rate of dissolution. This results in localized reaction of acid and carbonate salt with consequent loss of evolved $CO_2$. One way to avoid this problem is to dissolve the acid and carbonate salt separately and then combine the solutions. This, however, is cumbersome and time consuming.

With these shortcomings in mind, the present invention has as a general object to provide an improved dry food mix for forming carbonated beverages with the following characteristics and advantages; (a) the ability to form a high quality carbonated beverage having an excellent taste and aroma; (b) the ability to quickly dissolve with a minimum of stirring; (c) little tendency to form an unsightly insoluble deposit on the bottom of the glass; (d) little, if any, tendency to react chemically during storage, and (e) a highly porous, friable structure that is voluminous enough to quickly collapse and dissolve when added to a liquid to thereby disperse undissolved particles.

Briefly stated, the present invention provides a dried base which forms a carbonated drink when placed in water. The base consists of two bodies of material which in a preferred form of the invention are highly porous. The bodies may or may not be mechanically connected. One contains an acid and the other a carbonate which react to evolve carbon dioxide when placed in water. Premature reaction between acid and carbonate is prevented by physical separation of the acid and carbonate althrough mechanical connection is permitted.

Each of the mix bodies is composed of a matrix which is formed from an aqueous solution of a saccharide, and optionally a gum. These components are expanded and solidified by placing them in a vacuum and applying heat. One body consists of the matrix to which is added a finely divided food color and flavor together with the edible acid component. The other body is composed of a similar matrix containing an appropriate color and flavoring together with a carbonate. Briefly, in preparing the product, finely divided color, flavor, acid in one case and carbonate in the other case are separately mixed in two matrices to form a stiff syrup having the consistency of taffy (but which at room temperature may be fairly brittle). The taffy-like material will hereinafter be referred to as a plastic mass. The plastic mass is then heated to render it elastic and subjected to vacuum for a sufficient period of time to cause the mass to expand to a volume several times its original size.

The drink mix bodies prepared in accordance with the present invention may be thought of as a dispersion of active food ingredients in a highly soluble porous matrix. The high rate of solution of the matrix together with the high porosity of the body itself is largely responsible for the rapid dispersion of materials throughout the solution and the resulting uniform distribution and optimum solution of evolved $CO_2$.

The acid can consist of any edible food acid such as citric, malic, cyclamic or adipic acid. The source of $CO_2$, can be any edible alkali metal carbonate such as sodium bicarbonate. Thus, when the two phases are dissolved simultaneously, the acid and base are dispersed throughout the water and react almost instantaneously thereby carbonating the drink very rapidly and efficiently. If desired, in an artificially sweetened drink, the acid source for the reaction can be cyclamic acid, and the $CO_2$ source, $NaHCO_3$. A stoichiometric balance of these two ingredients yields sodium cyclamate, $CO_2$, and water with no other salt formation that may be undesirable from a flavor standpoint.

The two bodies can be bonded together or separate from one another, whichever is desired. Of course, if the two bodies are mechanically bonded together placing them in water is simplified.

The saccharide can be a monosaccharide, a disaccharide or polysaccharide or a mixture of several saccharides. It is, however, essential that the saccharide that is used be highly soluble in water. By the term "highly soluble" I mean that the saccharide should dissolve in an equal weight of water at room temperature. This will exclude certain of the relatively insoluble saccharides such as lactose. It must, moreover, exhibit a decreasing viscosity with an increase in temperature so that the matrix can be made fluid by heating it. The saccharide must, in other words, be thermoplastic. A third requirement is that the saccharide or mixture of saccharides have an amorphous form when dry rather than an exclusively crystalline form. Among the monosaccharides that can be used are xylose, glucose, mannose, glactose and fructose. Disaccharides, such as maltose, can also be used but lactose is not suitable because of its low solubility. Sucrose is unsuitable because of its crystallinity. Among the polysaccharides that can be used are mixed polysaccharides commonly referred to as dextrins. Dextrins are formed either by heat hydrolysis, acid hydrolysis or enzyme hydrolysis of starch. In general, any polysaccharide or mixture of polysaccharides which meets the solubility and viscosity characteristics mentioned above and which can have an amorphous form after being dried is suitable.

Dextrins produced excellent results by forming a matrix that allows puffing to occur and yet provide a light friable easily dissolved structure after being dried. At the same time, the dextrin adds little if any sweetness to the composition. One suitable dextrin is sold under the registered trademark Mor-Rex by Corn Products Company of 10 E. 56th, New York, N.Y.

The particle size of the color, flavor, acid and carbonate components before being dispersed in the matrix is not considered critical so long as there is a reasonably large surface area available to absorb moisture contained in the matrix during the initial mixing. Solid particles are preferably reduced to a powdered form to permit rapid dissolution. By "powdered form" I mean the particles have an average size of less than about 150 microns in diameter.

The gum can be any suitable edible gum in a minor amount. Examples are pectin, gum arabic, gum tragacanth, CMC and other cellulose gums, guar gum, Irish moss extracts, locust bean gum, etc.

The powdered food substances when added to the matrix should be present in a sufficient amount to convert the matrix to a plastic condition as distinguished from a syrup. The term "plastic" as used herein means the thickened mass of taffy-like consistency which flows so slowly that the flow cannot be seen unless the material is observed over an extended period of time.

The amount of powdered solids needed to produce a plastic condition in the matrix will depend upon the composition of the powdered solids and the concentration of the matrix. Generally, between about 0.2 and 2.0 parts of powdered solids can be used for each part of matrix (wet formula) with about 0.5–1.5 parts per one part of matrix being preferred. All amounts herein are expressed in parts by weight. The powdered solids may or may not dissolve in the matrix. In general, the color and flavor will dissolve in the matrix. A large portion of the acid and carbonate will, however, remain in suspension.

While either phase can be placed in water first, it is preferred to place the carbonate containing puffed body in the water before the acid. When that is done, a much higher degree of carbonation is achieved than otherwise.

The process used for preparing products in accordance with the invention will now be described.

The saccharide, water, acid or carbonate, as the case may be, gum and optionally a foaming agent, e.g., hydrolyzed vegetable protein are placed in a suitable mixing vessel, heated to render the mixture more fluid, and mixed vigorously until converted to a plastic mass. The mass will have a taffy-like consistency. The plastic mass is then subdivided into pieces of the desired size by molding, extrusion or sheeting followed by cutting, breaking or by any other suitable method. The pieces can be of any size but are typically about ¼ inch in diameter.

The pieces are then heated sufficiently to render them elastic. By "elastic" is meant capable of expanding freely when subjected to vacuum. A further reason for heating is to provide sufficient latent heat to vaporize the moisture required to effect the desired expansion as well as to reduce the moisture content of the matrix to the point where it ceases to be fluid at the elevated temperature. For most purposes, a temperature of about 120° F. to 200° F. and preferably between 150° F. and 180° F. is sufficient to render the plastic mass elastic. In the event the material tends to overpuff and thereby collapse after being subjected to vacuum due to too high temperature or moisture content, it is desirable, at least initially, to increase the vacuum slowly and steadily so that expansion will take place at a controlled rate. The vacuum is finally increased until a vacuum of at least 18 inches of water is reached. A vacuum of 25 to 29 inches of Hg is preferred. The final vacuum should not be low enough to cause uncontrolled bubbling nor should it decrease during the puffing operation.

The vacuum is maintained until the product is dry enough to be self-supporting. This usually occurs in about 10 minutes, but it is preferred to allow the product to remain in the vacuum chamber for about 30 minutes. The phases can be puffed separately and later bonded together or used separately. If desired, the plastic pieces can be bonded together before expansion and puffed simultaneously. If desired, the phases can be crushed, then mixed and stored in dry sealed packages.

The invention will be better understood by reference to the following example:

EXAMPLE I

All values represent weight in grams.

| Ingredient | Acid phase | Carbonate phase |
|---|---|---|
| Calcium cyclamate | 80.00 | 80.00 |
| Calcium saccharin | 6.39 | 6.39 |
| FD & C Yellow #6 | 5.40 | 5.40 |
| FD & C Red #2 | 0.11 | 0.11 |
| Orange flavor | 8.10 | 8.10 |
| Citric acid | 246.00 | |
| Sodium bicarbonate | | 77.00 |
| Total | 346.00 | 177.00 |

Formulae for pre-puffed product

Phase I: G.
   Acid component (see above) _____ 368
   Gum arabic _____ 100
   Corn syrup 43° Bé. 42 D.E. _____ 435

Total _____ 903

Phase II:
   Sodium bicarbonate component (see above) ___ 146
   Gum arabic _____ 40
   Corn syrup 43° Bé. 42 D.E. _____ 172

Total _____ 358

Phases I and II were blended separately to a taffy-like consistency, cooled, formed into pieces that were stoichiometrically balanced, and were puffed at 29" vacuum and 150° F. vacuum oven plate temperature. The resulting bodies were voluminous puffs having a very high rate of solubility.

When the above puffs were added to water, they dissolved very rapidly and $CO_2$ evolution was uniform throughout the glass of water.

We claim:

1. A dry drink base adapted to form a carbonated beverage when placed in water, said base comprising an acid phase defined by a porous friable body comprising an edible, soluble, thermoplastic, amorphous saccharide and an edible acid, and a carbonate phase defined by a porous friable body comprising an edible, highly soluble, thermoplastic amorphous saccharide and an edible alkali metal carbonate in a sufficient amount with respect to the acid to react therewith for producing a carbonated drink and said drink base containing minor amount of flavoring material.

2. The composition of claim 1 wherein an edible gum is present in at least one of the phases.

3. The composition of claim 1 wherein the alkali metal carbonate comprises sodium bicarbonate.

4. The composition of claim 1 wherein the saccharide comprises corn syrup and said drink base contains an edible gum.

5. The composition of claim 1 wherein the first and second bodies each consists of a puffed highly porous matrix composed of a saccharide and an edible gum.

6. The composition of claim 5 wherein the saccharide comprises corn syrup and the gum comprises gum arabic.

7. The composition of claim 1 wherein a minor amount of an artificial sweetener is present in the drink base.

8. The composition of claim 1 wherein the acid is citric acid, the carbonate comprises sodium bicarbonate, and about three parts of citric acid are used for each one part of sodium bicarbonate.

9. The composition of claim 1 wherein the drink base contains citric acid and sodium bicarbonate in the ratio of about 3 to 1 by weight, the saccharide comprises corn syrup and each of the phases includes a minor amount of an edible gum.

References Cited

UNITED STATES PATENTS

| | | | |
|---|---|---|---|
| 2,328,554 | 9/1943 | Heyman | 99—204 |
| 2,868,646 | 1/1959 | Schapiro | 99—78 |
| 2,984,543 | 5/1961 | Smith et al. | 99—78 X |
| 3,020,164 | 2/1962 | Forkner | 99—141 X |
| 1,512,730 | 10/1924 | Washington | 99—141 |

FOREIGN PATENTS

| | | | |
|---|---|---|---|
| 802,538 | 10/1958 | Great Britain | 99—140 |
| 1,018,343 | 1/1966 | Great Britain | 99—140 |

MORRIS O. WOLK, Primary Examiner

S. B. DAVIS, Assistant Examiner

U.S. Cl. X.R.

99—79, 141 R